US012775644B2

(12) United States Patent
Goh et al.

(10) Patent No.: US 12,775,644 B2
(45) Date of Patent: Oct. 27, 2026

(54) GENERATIVE ARTIFICIAL INTELLIGENCE SYSTEM FOR GENERATING CALIBRATED RESPONSES

(71) Applicant: MOTOROLA SOLUTIONS, INC., Chicago, IL (US)

(72) Inventors: Zhe Qian Goh, Bayan Lepas (MY); Bing Qin Lim, Bayan Lepas (MY); Jin Hoe Phua, Bayan Lepas (MY); Hwee Reei Chong, Bayan Lepas (MY)

(73) Assignee: MOTOROLA SOLUTIONS, INC.

( * ) Notice: Subject to any disclaimer, the term of this patent is extended or adjusted under 35 U.S.C. 154(b) by 270 days.

(21) Appl. No.: 18/616,556

(22) Filed: Mar. 26, 2024

(65) Prior Publication Data

US 2025/0307276 A1 Oct. 2, 2025

(51) Int. Cl.
*G06F 16/3329* (2025.01)
*G06F 16/383* (2019.01)

(52) U.S. Cl.
CPC ........ *G06F 16/3329* (2019.01); *G06F 16/383* (2019.01)

(58) Field of Classification Search
CPC ............... G06F 16/3329; G06F 16/383; G06F 16/33295; G06F 16/3334; G06F 16/3338; G06F 16/3332; G06F 40/30; G06N 20/00
See application file for complete search history.

(56) References Cited

U.S. PATENT DOCUMENTS

| | | | |
|---|---|---|---|
| 9,916,349 B2 | 3/2018 | Bolivar | |
| 11,775,533 B2 | 10/2023 | Lin et al. | |
| 2016/0188645 A1* | 6/2016 | Sharangpani | G06F 16/1744 707/741 |
| 2017/0109855 A1 | 4/2017 | Stockton et al. | |
| 2018/0052842 A1 | 2/2018 | Hewavitharana et al. | |
| 2021/0133234 A1 | 5/2021 | Bedadala et al. | |
| 2021/0191925 A1 | 6/2021 | Sianez | |

(Continued)

FOREIGN PATENT DOCUMENTS

EP 4036909 A1 8/2022

OTHER PUBLICATIONS

Brade, Stephen, et al. "Promptify: Text-to-image generation through interactive prompt exploration with large language models." Proceedings of the 36th Annual ACM Symposium on User Interface Software and Technology. 2023.

(Continued)

*Primary Examiner* — Huyen X Vo
(74) *Attorney, Agent, or Firm* — Perry + Currier Inc.

(57) ABSTRACT

An example method includes: receiving a query at a generative artificial intelligence (AI) system; obtaining a set of anchored words for calibrating a response to the query; identifying, at the generative AI system, one or more keywords from the query by cross-referencing the query to a secondary database; determining an anchoring weight of each of the one or more keywords based on the cross-referencing to the secondary database; updating the set of anchored words with the one or more keywords having the anchoring weight exceeding a threshold anchoring weight; and generating, at the generative AI system, an initial response to the query, wherein the initial response is calibrated by providing, to the generative AI system, the set of anchored words as additional prompts.

19 Claims, 4 Drawing Sheets

(56) References Cited

U.S. PATENT DOCUMENTS

| | | | | |
|---|---|---|---|---|
| 2023/0267342 | A1 | 8/2023 | Bansal et al. | |
| 2023/0306545 | A1 | 9/2023 | Schuler et al. | |
| 2025/0272332 | A1 * | 8/2025 | Pérez | G06F 16/435 |

OTHER PUBLICATIONS

Suh, Sangho, et al. "Structured Generation and Exploration of Design Space with Large Language Models for Human-AI Co-Creation." arXiv preprint arXiv:2310.12953 (2023).
Qin, Lim Bing et al., "Responsible AI that Distinguish "Generative" & "Factual" Generative AI content in Audio Form", motorolasolutions.com, 2023.
Motorola Solutions, "CC-Investigate—Uncover More Actionable Insights", motorolasolutions.com, 2022, Downloaded from the Internet on Mar. 26, 2024 from URL: https://www.motorolasolutions.com/content/dam/msi/docs/global-software/investigate/cc-investigate-brochure.pdf.
Microsoft Bing, "Copilot with Data Protection", microsoft.com, date unknown, Retrieved from the Internet on Mar. 26, 2024 from URL: https://www.microsoft.com/en-us/bing?ep=357&form=MA13MQ&es=31.

* cited by examiner

GENERATIVE ARTIFICIAL INTELLIGENCE SYSTEM FOR GENERATING CALIBRATED RESPONSES

BACKGROUND

Generative artificial intelligence (AI) systems leverage machine learning and neural network architectures to generate content, such as responses to queries.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
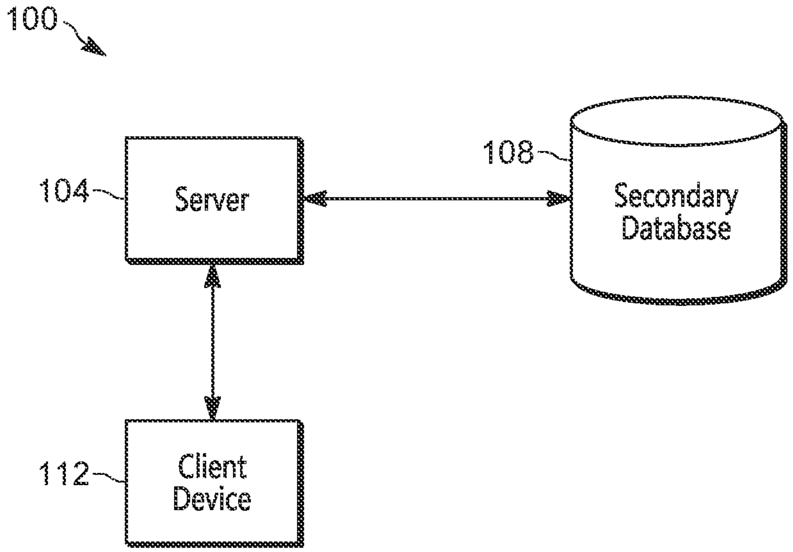
FIG. 1 is a block diagram of an example generative AI system for generating calibrated responses.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Generative AI systems rely on the data on which they were trained to output accurate content, and may therefore sometimes misdirect the focus of the generated responses. For example, the generative AI systems may focus or place emphasis on parts of a query not intended as the focus by the user. Further, after several iterations of queries and responses, the generative AI system may shift the focus and emphasis to more recent features, and may not retain context from earlier queries. The misdirection of focus may hinder effective interactions with the generative AI system.

In accordance with one example embodiments, a method includes: receiving a query at a generative artificial intelligence (AI) system; obtaining a set of anchored words for calibrating a response to the query; identifying, at the generative AI system, one or more keywords from the query by cross-referencing the query to a secondary database; determining an anchoring weight of each of the one or more keywords based on the cross-referencing to the secondary database; updating the set of anchored words with the one or more keywords having the anchoring weight exceeding a threshold anchoring weight; and generating, at the generative AI system, an initial response to the query, wherein the initial response is calibrated by providing, to the generative AI system, the set of anchored words as additional prompts.

In accordance with another example embodiment, a computing device includes: a memory storing executable code and a communications interface; a processor interconnected with the communications interface and the memory to execute code, the code operable to cause the processor to: receive a query; obtain a set of anchored words for calibrating a response to the query; generate, at a generative artificial intelligence (AI) model, an initial response to the query, wherein the initial response is calibrated by providing, to the generative AI model, the set of anchored words as additional prompts; and update the set of anchored words with one or more keywords from the query and the initial response.

Each of the above-mentioned embodiments will be discussed in more detail below, starting with example system and device architectures of the system in which the embodiments may be practiced, followed by an illustration of processing blocks for achieving an improved technical method, device, and system for generative artificial intelligence functions with calibrated responses.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, an example of a generative artificial intelligence (AI) system 100 for calibrating responses to queries is depicted. The generative AI system 100 (also referred to herein as simply the system 100) includes a server 104 interconnected with a secondary database 108. Generally, the system 100, and more particularly the server 104, receives queries, for example from a client device 112, and generates responses to those queries based on a generative AI model trained to respond to queries, for example based on natural language processing and/or industry-specific datasets.

The secondary database 108 may be any suitable database or repository storing relevant data for generating the responses. For example, the secondary database 108 may include industry and/or application-specific datasets based on the industry or application in which the system 100 is to be deployed. In the example described herein, the system 100 may be deployed in a law enforcement setting, and accordingly, the secondary database 108 may include an evidentiary and/or incident database, including police reports documenting incident data and incident reports, investigation charts, court documents, data and evidence, forensic data, camera and video recordings, and the like. In some examples, the secondary database 108 may be a single database, for example as collected and aggregated from a variety of sources by a law enforcement department or the like. In other examples, the secondary database 108 may represent a collection of independently hosted databases. In other examples, the secondary database 108 may include relevant data for other industries and/or applications in which the system 100 may be deployed. For example, the secondary database 108 may store healthcare data and reports, financial, banking and economic data, or the like.

The client device 112 may be any suitable computing device, such as desktop computer, another server, a kiosk, or another fixed computing device, a mobile device such as a tablet, a smart phone, or similar.

In operation, an operator may generate a query at the client device 112 and send the query to the server 104. The server 104 is configured to generate a response to the query, and in particular, a response which is calibrated based on a set of words, as will be further described herein. Specifically, the set of words provides additional context to the query by providing the words in the set as additional prompts which may not have been included in the query and considered in generating the response otherwise. The set of words are therefore referred to herein as anchors or anchored words and are said to anchor the query and/or response and/or certain context of the query and/or response. The server 104 is further configured to continually update the set of anchored words during interactions with the client device based on queries received, for example by cross-referencing the secondary database 108 to identify words from the query which are determined to have at least a threshold anchoring weight, and may therefore be added to the set of anchored words. Accordingly, when the server 104 generates the response to the query, the response is calibrated based on the set of anchored keywords (i.e., by providing the set of anchored keywords as additional prompts).

Figure 2:
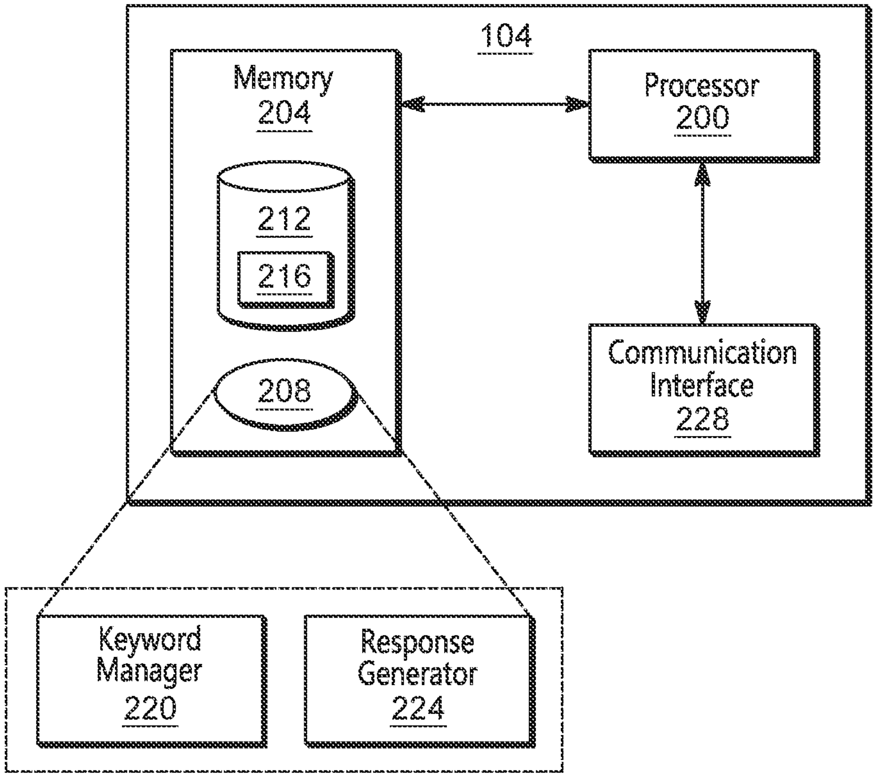
FIG. 2 is a block diagram of the server of FIG. 1.

Turning now to FIG. 2, certain internal components of the server 104 are illustrated. The server 104 includes a controller, such as a processor 200, interconnected with a non-transitory computer-readable storage medium, such as a memory 204.

The processor 200 may include one or more logic circuits, processing units, microprocessors, GPUs (Graphics Processing Units), ASICs (application-specific integrated circuits), FPGAs (field-programmable gate arrays) and/or other suitable units capable of executing instructions to carry out the functionality described herein. The memory 204 includes a combination of volatile memory (e.g., Random Access Memory or RAM) and non-volatile memory (e.g., read only memory or ROM, Electrically Erasable Programmable Read Only Memory or EEPROM, flash memory, etc.). The processor 200 and the memory 204 may each comprise one or more integrated circuits.

The memory 204 stores computer-readable instructions for execution by the processor 200. In particular, the memory 204 stores an application 208 which, when executed by the processor 200, configures the processor 200 to perform various functions discussed below in greater detail and related to the calibrated response generation operation of the server 104, and a repository 212 storing rules and data for generating calibrated responses. For example, the repository 212 may store a set or a list 216 of words which act as anchors (i.e., as provided by additional prompts) to queries. The set 216 may be fluid and dynamic and may be changed and updated based on identifications or detections from queries, cross-referencing of the secondary database 108, user inputs, and the like.

The application 208 may include code operable to generate calibrated responses. For example, the application 208 may include a keyword manager 220 configured to manage the set of anchored keywords, and a response generator 224 configured to generate responses to queries. The keyword manager 220 is configured to manage the set 216 of anchored keywords, for example by identifying new keywords to be added to the set 216, updating weights of the anchored keywords in the set 216, and removing keywords from the set 216, as will be further described herein.

The response generator 224 is configured to receive queries as inputs and generate responses to said queries as outputs. For example, the response generator 224 may be a generative AI model, such as a proprietary generative AI model specifically trained for the industry and/or application in which the system 100 is being deployed, or the like, which ingests the query and generates a text response. In other examples, the response generator 224 may be configured to interface with an application program interface (API) of a separate generative AI model (e.g., an off-the-shelf model, including, but not limited to, ChatGPT, Google Bard, or the like) to obtain a response. The response generator 224 may be integrated with the secondary database 108 for reference as a fact basis, with the generative AI model configured to parse the data contained in the secondary database 108 and generate a natural language response.

Some or all of the application 208 may also be implemented as a suite of distinct applications. Those skilled in the art will appreciate that the functionality implemented by the processor 200 via execution of the application 208 and the code contained therein may also be implemented by one or more specially designed hardware and firmware components.

The server 104 may further include a communications interface 228 enabling the server 104 to exchange data with other computing devices, such as the secondary database 108 and the client device 112. The communications interface 228 is interconnected with the processor 200 and includes suitable hardware (e.g., transmitters, receivers, network interface controllers and the like) allowing the server 104 to communicate with other computing devices. The specific components of the communications interface 228 may be selected based on the type of network or other links that the server 104 is to communicate over. For example, the communications interface 228 may be configured for wired communications, including Ethernet, USB (Universal Serial Bus), twisted pair, coaxial, fiber-optic or similar physical connections, or wireless communications, including one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series standard), a Worldwide Interoperability for Microwave Access (WiMAX) network, for example operating in accordance with an IEEE 802.16 standard, and/or another similar type of wireless network, combinations of the above, and the like.

The server 104 may further include one or more input and/or output devices (not shown). The input devices may include one or more buttons, keypads, touch-sensitive display screens or the like for receiving input from an operator. The output devices may further include one or more display screens, sound generators, vibrators, or the like for providing output or feedback to an operator.

Figure 3:
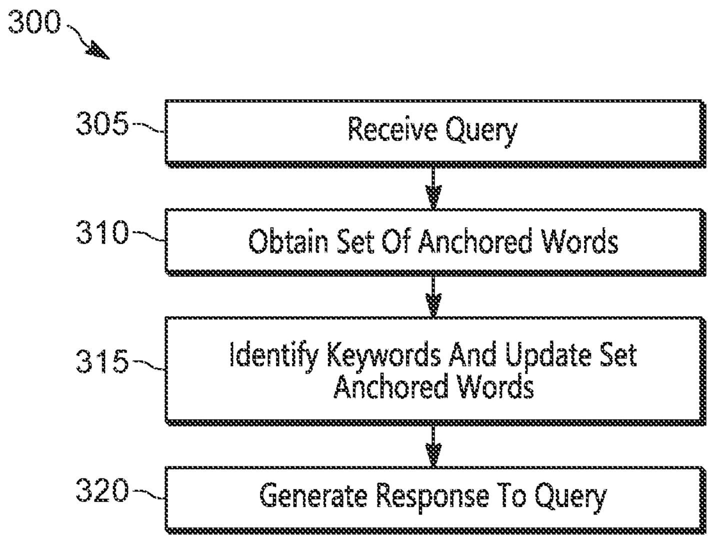
FIG. 3 is a flowchart of an example method of generating calibrated responses in a generative AI system.

Turning now to FIG. 3, the functionality implemented by the server 104 will be discussed in greater detail. FIG. 3 illustrates a method 300 of generating calibrated responses to queries. The method 300 will be discussed in conjunction with its performance in the system 100, and particularly by the server 104, via execution of the application 208. In particular, the method 300 will be described with reference to the components of FIGS. 1 and 2. In other examples, some or all of the method 300 may be performed by other suitable devices or systems.

The method 300 is initiated at block 305, where the server 104 receives a query. For example, the query may be received from the client device 112. The query may be a natural language query, for example to extract certain data, discover more information about a subject, or the like. In particular, the query may pertain to the industry and/or application in which the system 100 is deployed. For example, in a law enforcement context, the query may be related to facilitate an investigation to identify evidence, discover and understand timelines and links between various pieces of evidential data, and the like.

At block 310, the server 104 obtains the set 216 of anchored words from the repository 212. The set 216 of keywords represents additional context in which the query received at block 305 is to be anchored. For example, the set of keywords may include a predefined context (e.g., based on the law enforcement or other application-specific context), relevant context from previous sessions interacting with the generative AI system 100, context from one or more previous queries and/or responses (i.e., within the same session interacting with the generative AI system 100), or the like. In particular, the set 216 of keywords obtained at block 310 may represent longer-term and/or more persistent context to be applied and used in calibrating the response to the query received at block 305, irrespective of whether or not the query specifically calls out the context obtained from the set 216. That is, the set 216 represents a memory of the server 104 and calibrates the response generator 224 to generate appropriately contextualized and/or anchored responses.

At block 315, the server 104 may further identify one or more additional keywords from the query received at block 305 to be added to the set 216 of keywords.

Figure 4:
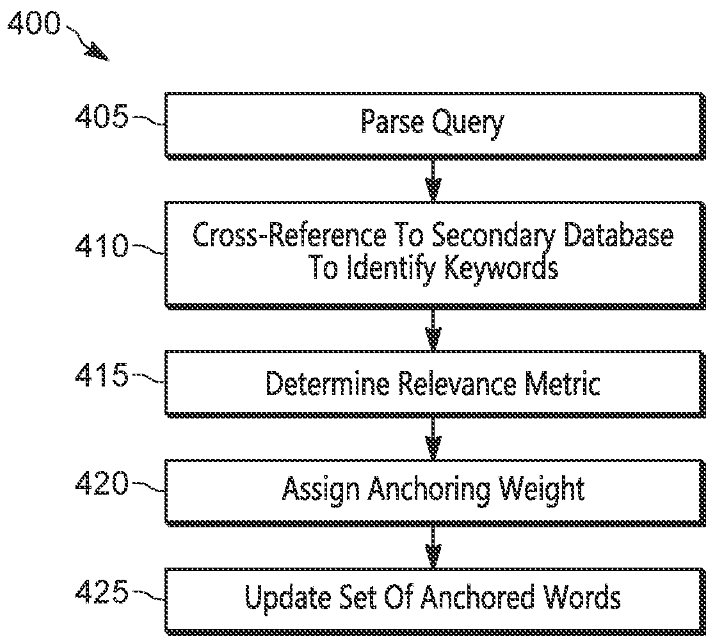
FIG. 4 is a flowchart of an example method of identifying keywords and updating a set of anchored words.

For example, referring to FIG. 4, an example method 400 of identifying keywords in a query and updating the set of anchored words. For example, the method 400 may be performed by the keyword manager 220, via execution by the processor 200.

At block 405, the server 104 may be configured to parse the query to identify terms, such as significant words and/or phrases. For example, the parsing may be based on natural language processing to find subjects, objects, and the like.

At block 410, the server 104 is configured to cross-reference the terms identified at block 405 to the secondary database 108 to filter the terms to keywords (or terms). For example, if the secondary database 108 is an evidentiary database in a law enforcement setting, then the cross-referencing may be to select terms from the query which relate to some form of evidence (e.g., a subject or suspect, a particular identified location, etc.).

In some examples, the cross-referencing may further be based on data in the secondary database 108 associated with an account from which the query is received. For example, an operator (e.g., a law enforcement officer, investigator, or the like) may use the client device 112 to send a query to the server 104 from a secure account associated with the operator. Further, the secondary database 108 may store evidence and data associated with particular case files. Each case file may be associated with one or more accounts. Accordingly, the cross-referencing may be based on data for case files associated with the account from which the query originated. Such cross-referencing may facilitate filtering the terms from the query to keywords which may have particular significance to the query (e.g. only the data that is related to the incident case that is actively investigated by the law enforcement officer will be cross-referenced).

In particular, to identify the significance of a given term or keyword, at block 415, the server 104 is configured to determine a relevance metric for each keyword.

According to one example, the server 104 may be configured to obtain the results of a link analysis on the secondary database 108 and use the link analysis to determine the relevance metric. The link analysis may, for example, define a plurality of nodes in the secondary database 108, with each node representing a person, object, target, location, or other concept or the like in an investigation (or in another environmental setting in a different application and/or industry, as applicable). Each of the nodes may be linked to one or more other nodes based on connections between the concepts represented by the nodes. For example, a link may be defined between a person attending a specific location, between two people who know each other, or other similar connections.

To determine a relevance metric for each of the terms in the query, the server 104 may be configured to map the identified term to one of the nodes in the link analysis and assign a relevance metric according to the corresponding weight of the node in the link analysis. For example, the relevance metric may simply be a factor of the number of links for the node. In other examples, other suitable statistical models (e.g., based on a standard distribution or the like) may also be applied to correlate the weight of the node in the link analysis to a relevance metric for the term. Generally, terms corresponding to nodes with a higher number of connections in the link analysis may be assigned a higher relevance metric, while terms corresponding to nodes with a lower number of connections in the link analysis may be assigned a lower relevance metric.

In some examples, the link analysis may additionally be filtered based on other factors, such as the case and/or account associated with the query and/or terms. For example, a location may have high relevance to one case investigated by one account, but low relevance to another case investigated by a different account, and accordingly, a holistic link analysis of the entire secondary database may be misleading. Accordingly, the link analysis may instead be filtered based on case and/or account associations from the query.

In other examples, the server 104 may determine the relevance metric at least in part based on parameters of the term within the secondary database 108. For example, the parameters may include the type of document and/or evidence basis in which the term appears. That is, a term appearing in a court submission may carry greater weight than a term appearing in a 911 transcription text of the incident or newspaper clipping. In another example, a term related to an evidence appearing in a court submission may carry greater weight than a term related to an evidence that is not appearing in the court submission. Accordingly, the server 104 may be configured to evaluate the parameters associated with the terms and weight the terms proportionally. In other examples, other parameters, such as the type of evidence (e.g., a relevant weapon versus an article of clothing), the source of the evidence (e.g., obtained on scene vs anecdotal), or the like, may also be evaluated and used to weight the relevance metric for the term.

In some examples, the relevance metric may be determined based on a combination of the link analysis and the parameters of the term and/or other factors.

At block 420, the server 104 is configured to assign an anchoring weight to each of the terms identified at block 410 based on the corresponding relevance metrics determined at block 415. In particular, the relevance metric may represent an objective measure of the relevance of the word, phrase or term within the context of the secondary database 108, while the anchoring weight may represent a level or measure of persistence of the word, phrase or term within the context of a query-response session at the generative AI system 100, and more particularly, for the response generator 224. Thus, the anchoring weight may represent a length of time or a number of query-response combinations over which the term should persist.

The anchoring weight may be directly proportional to the relevance metrics determined at block 415. In other examples, different factors contributing to the relevance metric may contribute different weights to the anchoring weight.

At block 425, the server 104 updates the set 216 of anchored words stored in the repository 212. In particular, the server 104 may compare, for each keyword identified at block 410, the anchoring weight for the keyword to a predefined threshold anchoring weight. If the anchoring weight exceeds the threshold anchoring weight, then the server 104 may update the set 216 to include the keyword (i.e., to anchor the keyword). If the anchoring weight does not exceed the threshold anchoring weight, then the server 104 may take no action with respect to the set 216 and the keyword. Additionally, the server 104 may store, in the repository 212, in association with the set 216 of anchored words, the anchoring weight of each anchored word to track the persistence of the anchored word over subsequent queries and responses.

In some examples, if the keyword or a related keyword (e.g., as identified based on the root of the word and/or phrase) already exists in the set 216, the server 104 may refresh or update the anchoring weight with the newly computed anchoring weight. For example, the newly computed anchoring weight may simply replace the previous anchoring weight for the keyword; in other examples, anchoring weight may be updated to be a sum or a weighted sum of the newly computed anchoring weight from block 425 with the previous anchoring weight (e.g., to extend the persistence of the keyword), or the like.

Returning to FIG. 3, at block 320, the server 104 is configured to generate an initial response to the query received at block 305. In particular, the initial response may be calibrated by providing, to the response generator 224, the set 216 of anchored words as additional prompts. That is, the response generator 224 may ingest both the query received at block 305 as well as the set 216 as inputs for generating the response to the query. The server 104 may return the calibrated response to the client device 112 from which the query was received.

In some examples, the server 104 may perform block 320 after identifying and updating the set 216 of anchored words at block 315, for example by performance of the method 400, as presently illustrated. In other examples, the server 104 may perform blocks 320 and blocks 315 substantially simultaneously and/or the server 104 may perform block 320 prior to performing block 315. That is, the response generated at block 320 may be calibrated on the set 216 of anchored words obtained irrespective of any updates to the set 216 at block 315. In still further examples, identifying and updating further keywords at block 315 may be performed on both the query received at block 305 and the response generated at block 320. That is, the server 104 may identify some of the keywords and/or phrases used in the initial response as keywords to be anchored for future context.

In some examples, at block 320, the server 104 may additionally be configured to update the anchoring weight associated with each keyword in the set 216 of anchored words to reduce the anchoring weight based on the passage of a query-response combination. For example, if the anchoring weight represents the number of query-response combinations for which the word should persist in the set 216, then the server 104, and in particular the keyword manager 220, may reduce the anchoring weight of each keyword by one for every passage of a query-response combination. The server 104 may further remove words from the set 216 for which the corresponding updated anchoring weight is below the threshold anchoring weight. In other examples, updating the anchor weight may be performed upon receipt of a new query rather than after generating a response.

In some examples, the server 104 may additionally return an indication to the client device 112 from which the query was received, indicating the anchored words in the set 216. The indication may be used to provide a cue, at a graphical user interface of the client device 112, each anchored word appearing in the initial query (i.e., received at block 305) or the initial response (i.e., generated at block 320). For example, the cue may be a predefined format of the text, such as bolding, underlining, italicizing, capitalizing, including the anchored words and/or phrases between predefined delimiters, combinations of the above, and the like.

The set 216 of anchored words therefore acts to anchor the query with certain context. In particular, since the set 216 is stored and managed independently of the query, the set 216 may include keywords or phrases from previous queries (e.g., earlier in the query-response session) which were deemed to have sufficient relevance to be maintained as context. This may allow keywords or phrases to be considered for context, even if such keywords or phrases were not included in the query received at block 305.

Figure 5:
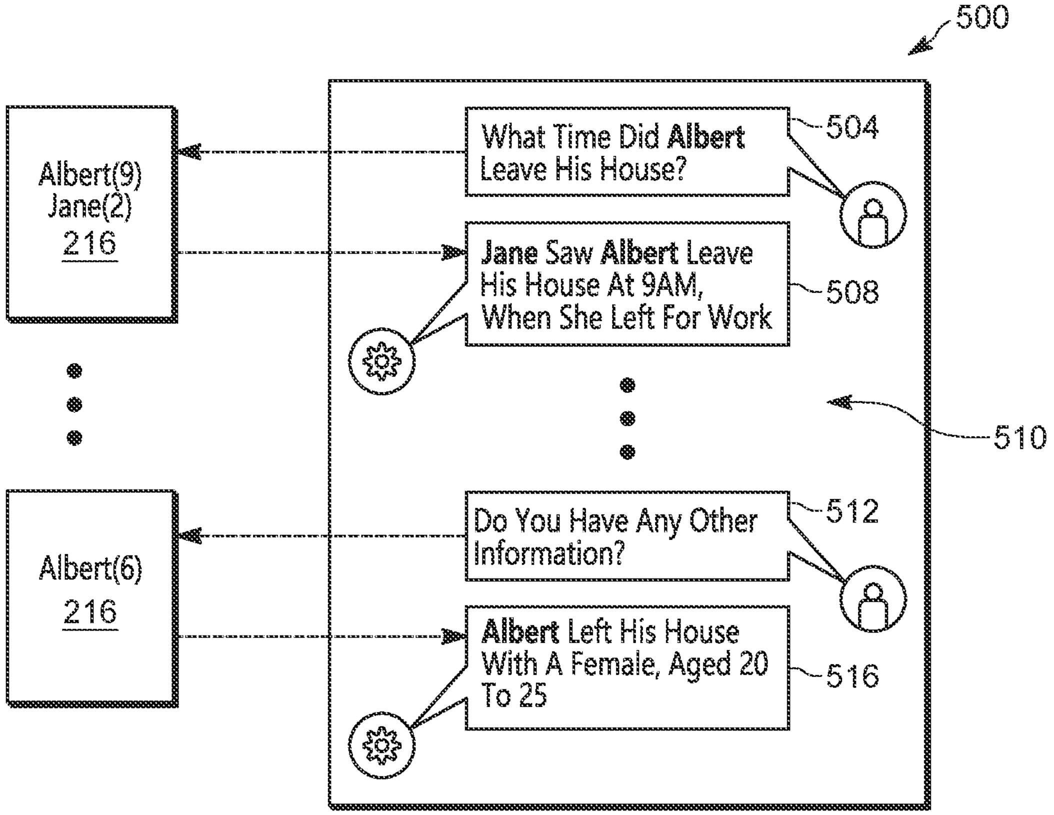
FIG. 5 is a schematic diagram of a session with a generative AI system with calibrated responses.

For example, referring to FIG. 5, a schematic diagram of a session 500 is depicted. The session 500 includes a first query 504, in which a user asks the question "What time did Albert leave his house?". The server 104 may generate an initial response 508 indicating that "Jane saw Albert leave his house at 9AM, when she left for work". The server 104 may, via performance of the method 400, identify the keywords "Albert" and "Jane" and cross-reference them to the secondary database 108. Based on the cross-referencing, the server 104 may assign "Albert" an anchoring weight of nine, and "Jane" an anchoring weight of two, exceeding a threshold anchoring weight (e.g., of zero), and accordingly, may update the set 216 with both "Albert" and "Jane". Further, the server 104 may be configured to provide, at a user interface of the client device 112, cues indicating each anchored word in the set of anchored words appearing in the first query 504 or the initial response 508. For example, as presently depicted, the server 104 may provide an instruction to format the keywords "Albert" and "Jane" in bold text.

The user and the server 104 may proceed through a number of iterations 510 of queries and responses (e.g., representing one or more iterations through the method 300), during which time the server 104 may continue to update the set 216 with new anchored words, as well as updating the anchoring weights of each of the anchored words according to predefined rules for updating the anchoring weight (e.g. reducing anchoring weight for each query-response passage). In particular, after a number of iterations, the keyword "Jane" may have its anchoring weight reduced to zero and may therefore be removed from the set 216 of anchored words. The keyword "Albert" may maintain a sufficient anchoring weight, for example of six, and may be maintained on the set 216.

After the iterations 510, the server 104 may receive a subsequent query 512 (i.e., at a subsequent iteration of the method 300), in which the user asks "Do you have any other information?". In generating the response to the subsequent query 512, the server 104 may calibrate the response based on the set 216 of anchored words. That is, in addition to the subsequent query 512, the set 216 of anchored words may be provided as additional prompts to the response generator 224. Notably, while the query 512 does not identify any particular subject about which the server 104 should center the response, the response generator 224 may receive the updated set 216, including the keyword "Albert" maintained on the set from the first query 504. Accordingly, in identifying "any other information" in response to the subsequent query 512, the server 104 may further identify, as additional context, the anchored keyword "Albert" and hence may determine if there is "any other information" relating to "Albert" in the secondary database 108. Accordingly, the server 104 may generate a subsequent response 516, stating that "Albert left his house with a female aged 20 to 25" which is calibrated based on the set 216 of anchored words.

Figure 6:
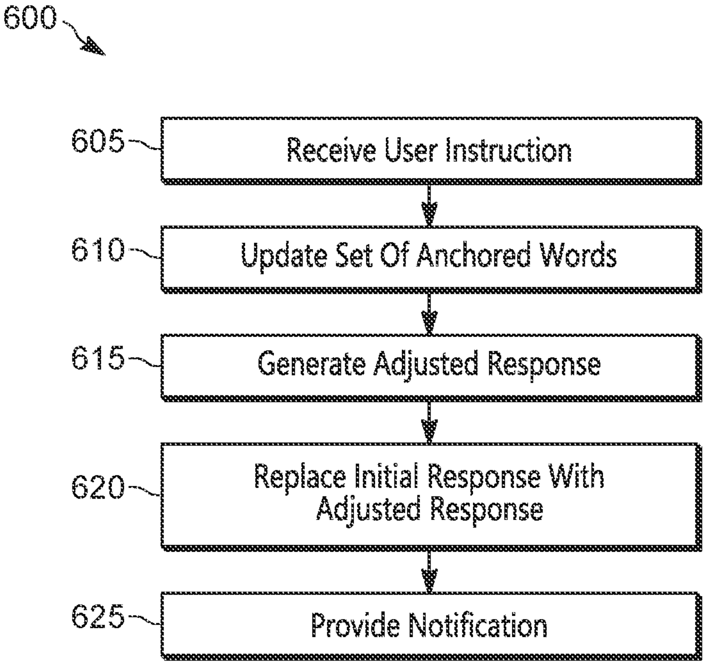
FIG. 6 is a flowchart of an example method of processing a user instruction for updating a set of anchored words.

In addition to automatically identifying and storing keywords as anchored words, the system 100 may further permit manual identification of keywords or phrases to anchor to provide context and persistence of the context over the course of a conversation or session (i.e., multiple query-response combinations). For example, referring to FIG. 6, an example method 600 processing manual indications of anchored words and calibrating responses is depicted. For example, the method 600 may be performed after a calibrated response to a query is generated via performance of the method 300.

At block 605, the server 104 receives a user instruction to update the set 216 of anchored words. For example, the server 104 may receive the user instruction via detection of a formatting instruction at a graphical user interface of the client device 112. That is, a user may apply formatting at the graphical user interface to a given word or phrase. For example, the formatting instruction may include, but is not limited to: bolding, italicizing, underlining, capitalizing of text, for example included in the query received at block 305, or the initial response generated at block 320. Further, the formatting instruction may include removal of the above-noted formatting. In other examples, the formatting instruction may include text-based indicators, such as enclosing the given word or phrase between a set of predefined delimiters, such as brackets, angle brackets, square brackets, asterisks, pipes, and the like. In still further examples, other suitable formatting instructions are also contemplated, and similarly, other representations or indications of a user instruction are also contemplated.

At block 610, the server 104 updates the set 216 of anchored words based on the user instruction. For example, the user instruction may include either an anchoring instruction to add one or more additional words to the set of anchored words, or a de-anchoring instruction to remove one or more anchored words from the set of anchored words. In the example in which the user instruction is represented by a formatting instruction, the application of particular formatting may represent an anchoring instruction, while the removal of particular formatting may represent a de-anchoring instruction.

Accordingly, based on the user instruction, the server 104, and more particularly the keyword manager 220, may either add the given word or phrase to the set 216 of anchored words in response to an anchoring instruction, or remove the anchored word or phrase from the set 216 in response to a de-anchoring instruction.

In the case of an anchoring instruction, the server 104 may further be configured to determine an anchoring weight, for example according to the operations outlined with respect to blocks 415 and 420 of the method 400 above. That is, the server 104 may determine a relevance metric and use the relevance metric to automatically apply an anchoring weight to the identified word or phrase to be added to the set 216.

In some examples, where the anchoring weight may be zero based on the automatic anchoring weight determination, the server 104 may be configured to add one or another suitable minimum value for anchored words added to the set 216 in response to a user instruction. In other examples, prior to updating the set 216 of anchored words, the server 104 may perform a verification on the expected anchoring weight. That is, rather than setting a minimum anchoring weight simply based on the relevance metric, if the anchoring weight is below the threshold anchoring weight, rather than adding the given word to the set 216, the server 104 may be configured to prompt the user to add data pertaining to the given word to the secondary database 108. For example, the server 104 may provide an indication to be output at the client device 112 that insufficient data pertaining to the given word exists in the secondary database 108. In some examples, the server 104 may also provide, at the client device 112, a mechanism to allow further data to be uploaded to the secondary database 108. For example, if a keyword "gun" is bolded by the user and the relevance metric is below a certain threshold after cross-referencing to the associated secondary database, the user may be prompted to upload, an image of the gun or another suitable representation and/or evidence of the gun, in order for the user to anchor the keyword "gun". This may reduce instances of keywords being wrongly anchored and misleading the investigation direction of the incident case.

In other examples, the anchoring weight may be defined at least in part by the anchoring instruction. For example, the anchoring instruction may be associated with a predefined anchoring weight. Alternately, certain types of formatting may be associated with a first predefined anchoring weight, while certain other types of formatting may be associated with a second predefined anchoring weight. Accordingly, the server 104 may determine the desired anchoring weight and therefore persistence of the context based on the type of formatting selected by the user. For example, a "bold" anchoring instruction may make the keyword persist without reduction of anchoring weight through the query-response passages until a user manually performs an unanchoring instruction of "unbold" on the same keyword; while an "italic" anchoring instruction may anchor the keyword with anchoring weight that will reduces over query-response passages. In another example, an "italic" anchoring instruction will give the keyword higher anchoring weight to persist for a longer time in query-response passages but an "underline" anchoring instruction will give the keyword lower anchoring weight to persist for a shorter time in query-response passages.

At block 615, the server 104 is configured to generate an adjusted response, calibrated based on the set 216 of anchored words. That is, the server 104 is configured to generate a second response to the query, using the set 216 of anchored words as additional prompts, as updated at block 610 in response to the user instruction. The second response may be treated and generated independently of the initial response generated at block 320. The adjusted response may therefore be calibrated to consider context as indicated by the user instruction (i.e., to either consider additional context, or to disregard previously emphasized context).

At block 620, the server 104 is configured to replace the initial response (i.e., as generated at block 320) with the adjusted response. For example, the server 104 may provide the adjusted response for display at the graphical user interface of the client device 112. In particular, the initial response may be removed and replaced with the adjusted response to present the adjusted response as a revision and/or a revised response to the initial query. The adjusted response may be presented similarly to the initial response, for example with cues indicating anchored words from the set 216 appearing in the adjusted response.

At block 625, the server 104 is configured to provide a notification that the initial response is replaced with the adjusted response. For example, the notification may be issued at the client device 112 and may include any suitable audio, visual, mechanical, or other notification mechanisms. For example, while generating the response, the server 104 may provide an instruction to the client device to display a response generation progress indicator (e.g., a typing or waiting animation, progress bar, or similar). Further, when the initial response is replaced with the adjusted response, the adjusted response may be displayed with a warning message and/or notification, a visual indicator such as a bolded border, or similar, to indicate the change from the initial response to the adjusted response. In one example, the notification may include highlighting or summarizing the difference between the initial response and the adjusted response.

Figure 7A:
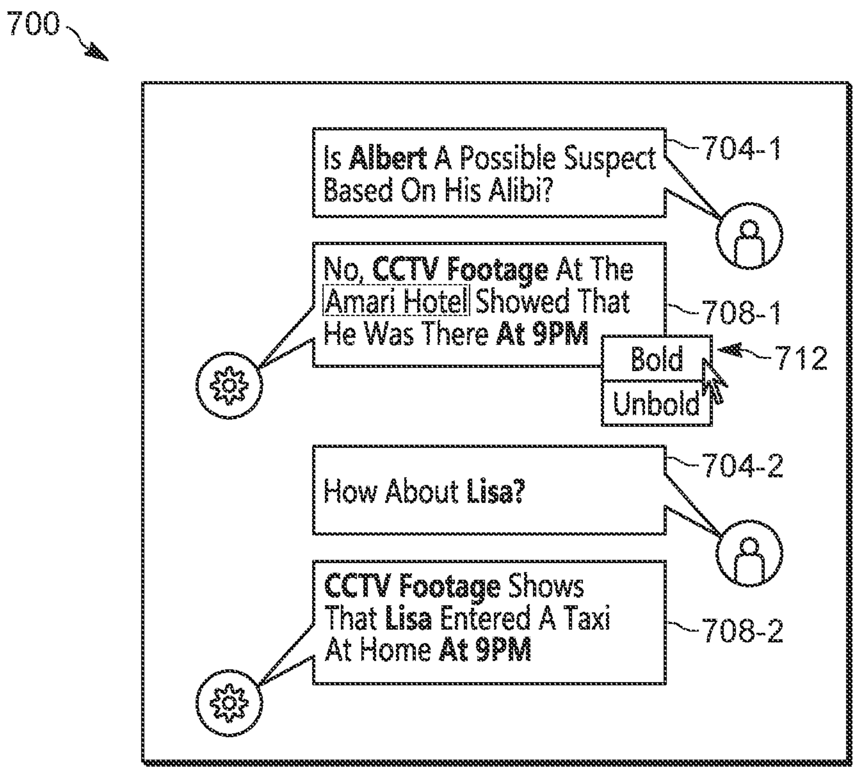
FIGS. 7A and 7B are schematic diagrams of sessions of generating adjusted calibrated responses.
Figure 7B:
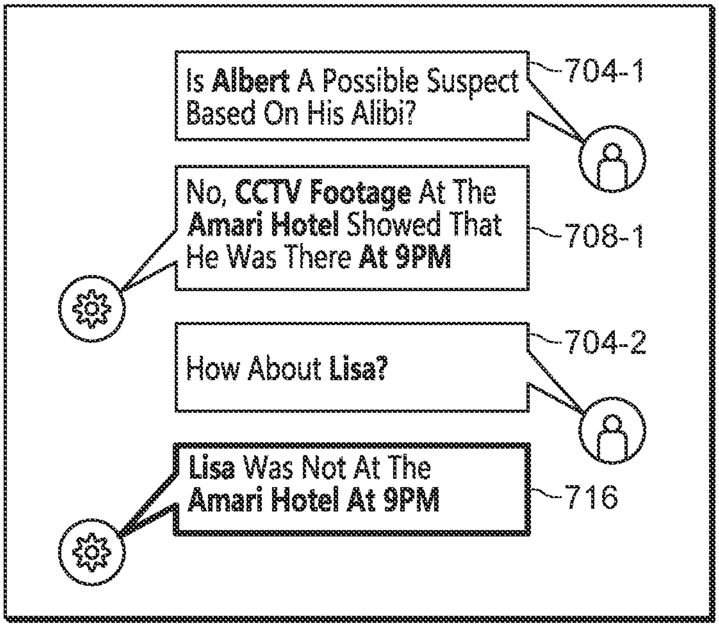

For example, referring to FIGS. 7A and 7B, an example session 700 is depicted. The session 700 includes a first query 704-1 from a user asking "Is Albert a possible suspect based on his alibi?". The server 104 may generate a first initial response 708-1 indicating that "No, CCTV footage at the Amari Hotel showed that he was there at 9PM". The first query 704-1 and the first initial response 708-1 may represent a first iteration of the method 300. Further, in the first iteration, the server 104 may identify the keywords "Albert", "CCTV footage" and "at 9PM" as anchored words in the set 216.

In another iteration of the method 300, the session 700 may include a second query 704-2 from the user asking "How about Lisa?". The server 104 may generate a second initial response 708-2 indicating that "CCTV footage shows that Lisa entered a taxi at home at 9PM". In particular, the second initial response 708-2 based at least in part on the context provided by the set 216 of anchored words.

Based on the response and their intent with the second query 704-2, the user may identify that the term "Amari Hotel" should additionally be added as an anchored word in the set 216, and hence may provide a user instruction 712, in the form of a formatting instruction, in the present example to bold the text "Amari Hotel". Based on the user instruction, the server 104 may add the term "Amari Hotel" as an anchored word in the set 216 and may generate an adjusted response 716 to the second query 704-2. The adjusted response 716 may be calibrated using the updated set 216 including the newly added term "Amari Hotel" highlighted in the user instruction 712. After generating the adjusted response 716, the server 104 may replace the initial response 708-2 with the adjusted response 716, and may provide a cue to the user, for example by providing a bolded border around the adjusted response 716. In other examples, other cues, including audio indicators or the like, are also contemplated.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot provide context to a generative artificial intelligence model in the form of, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:

receiving a query at a generative artificial intelligence (AI) system;

obtaining a set of anchored words for calibrating a response to the query;

identifying, at the generative AI system, one or more keywords from the query by cross-referencing the query to a secondary database;

determining an anchoring weight of each of the one or more keywords based on the cross-referencing to the secondary database;

updating the set of anchored words with the one or more keywords having the anchoring weight exceeding a threshold anchoring weight; and generating, at the generative AI system, an initial response to the query, wherein the initial response is calibrated by providing, to the generative AI system, the set of anchored words as additional prompts.

2. The method of claim 1, wherein the query is received from an account, and wherein the cross-referencing is further based on data in the secondary database associated with the account from which the query is received.

3. The method of claim 1, wherein determining the anchoring weight of a given keyword comprises assigning an anchoring weight correlating to a relevance metric of the given keyword in the secondary database.

4. The method of claim 1, further comprising:

after generating the initial response, updating the anchoring weight of each word in the set of anchored words; and removing words from the set of anchored words having an updated anchoring weight below the threshold anchoring weight.

5. The method of claim 4, further comprising:

receiving, at the generative AI system, a subsequent query; and generating, at the generative AI system, a subsequent response to the subsequent query, based on the set of anchored words as additional prompts to the generative AI system.

6. The method of claim 1, further comprising: providing, at a user interface, a cue indicating each anchored word in the set of anchored words appearing in the initial response.

7. The method of claim 1, further comprising:

receiving a user instruction to update the set of anchored words;

updating the set of anchored words according to the user instruction; and generating an adjusted response to the query based on the updated set of anchored words to anchor the adjusted response.

8. The method of claim 7, wherein the user instruction comprises: (i) an anchoring instruction to add one or more additional word to the set of anchored words; or (ii) a de-anchoring instruction to remove one or more anchored word from the set of anchored words.

9. The method of claim 7, wherein receiving the user instruction comprises detecting a formatting instruction of a given word at a graphical user interface; and wherein the set of anchored words is updated based on the given word.

10. The method of claim 7, further comprising replacing the initial response with the adjusted response; and providing a notification that the initial response is replaced with the adjusted response.

11. The method of claim 7, further comprising:

verifying an expected anchoring weight of a given word from the user instruction; and when the expected anchoring weight is below the threshold anchoring weight, prompting a user to add data to the secondary database prior to updating the set of anchored words to add the given word to the set of anchored words.

12. The method of claim 1, wherein the secondary database comprises an incident database comprising one or more of: incident data, incident reports, an investigation chart, 911 emergency call transcription, court evidence, and court data.

13. A computing device comprising:

a memory storing executable code and a communications interface;

a processor interconnected with the communications interface and the memory to execute code, the code operable to cause the processor to:

receive a query;

obtain a set of anchored words for calibrating a response to the query;

generate, at a generative artificial intelligence (AI) model, an initial response to the query, wherein the initial response is calibrated by providing, to the generative AI model, the set of anchored words as additional prompts;

identify the one or more keywords from the query and the initial response by cross-referencing the query and the initial response to a secondary database;

determine an anchoring weight of each of the one or more keywords based on the cross-referencing to the secondary database; and update the set of anchored words with the one or more keywords from the query and the initial response having the anchoring weight exceeding a threshold anchoring weight.

14. The computing device of claim 13, wherein the secondary database comprises an incident database comprising one or more of: incident data, incident reports, an investigation chart, 911 emergency call transcription, court evidence, and court data.

15. The computing device of claim 13, wherein the code is further operable to cause the processor to:

after generating the initial response, update the anchoring weight of each word in the set of anchored words; and remove words from the set of anchored words having an updated anchoring weight below the threshold anchoring weight.

16. The computing device of claim 13, wherein the code is further operable to cause the processor to:

receive a subsequent query; and generate, at the generative AI model, a subsequent response to the query, wherein the subsequent response is calibrated by providing, to the generative AI model, the updated set of anchored words as additional prompts, wherein the updated set of anchored words includes the one or more keywords from the initial query and the initial response.

17. The computing device of claim 13, wherein the code is further operable to cause the processor to:

in response to receiving a user instruction to update the set of anchored words, update the set of anchored words according to the user instruction; and generate an adjusted response to the query based on the updated set of anchored words to anchor the adjusted response.

18. The computing device of claim 17, wherein the user instruction comprises: (i) an anchoring instruction to add one or more additional word to the set of anchored words; or (ii) a de-anchoring instruction to remove one or more anchored word from the set of anchored words.

19. The computing device of claim 17, wherein receiving the user instruction comprises detecting a formatting instruction of a given word at a graphical user interface; and wherein the set of anchored words is updated based on the given word.

* * * * *